(12) United States Patent
Erickson (10) Patent No.: US 6,966,728 B1
(45) Date of Patent: Nov. 22, 2005

(54) TOOLHOLDER ASSEMBLY

(75) Inventor: Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/863,418

(22) Filed: Jun. 8, 2004

(51) Int. Cl.⁷ ............................................. B23B 29/00
(52) U.S. Cl. .................. 407/101; 407/108; 82/158; 82/160
(58) Field of Search .................. 82/158, 160; 407/101, 407/104, 108; 403/374.3, 374.2, 374.4; 411/24, 411/25

(56) References Cited

U.S. PATENT DOCUMENTS

| | | | |
|---|---|---|---|
| 4,813,831 A | * | 3/1989 | Reinauer ..................... 409/232 |
| 4,981,057 A | * | 1/1991 | von Haas et al. ............. 82/160 |
| 5,040,931 A | * | 8/1991 | Spivey et al. ............... 408/185 |
| 5,417,131 A | * | 5/1995 | Robertson .................... 82/158 |
| 5,873,682 A | * | 2/1999 | Tripsa ........................ 407/101 |
| 6,270,293 B2 | | 8/2001 | Erickson et al. |
| 6,415,696 B1 | | 7/2002 | Erickson et al. |

* cited by examiner

*Primary Examiner*—Willmon Fridie, Jr.
(74) *Attorney, Agent, or Firm*—Larry R. Meenan (57) ABSTRACT

A toolholder assembly for releasably holding a toolholder at a selected radial location within the toolholder assembly. The toolholder assembly includes a tool support member, an actuating bolt and an actuating centering nut. Rotation of the actuating bolt in a locking direction centers the actuating centering nut, actuating bolt and the toolholder with respect to the radial axis of a bore within the tool support member.

16 Claims, 7 Drawing Sheets

TOOLHOLDER ASSEMBLY

FIELD OF THE INVENTION

The invention is directed to tooling for machining operations and, more particularly, directed to a toolholder assembly for precisely holding a toolholder at a selected radial location within the toolholder assembly during a machining operation.

BACKGROUND OF THE INVENTION

Minimizing the downtime of a machine tool in a production environment is critical to the success of a manufacturing facility. Historically, one major contributor to such downtime was the time needed to change damaged or worn out cutting tools used by the machine tool. A cutting tool is held by a toolholder, which is typically mounted within a tool support member secured to a machine tool. When the cutting tool must be replaced, the entire toolholder with the cutting tool is removed from the spindle. A number of couplings are designed to permit quick connecting and disconnecting of the toolholder to and from the spindle to expedite the tool changing process. One such device is described in U.S. Pat. No. 4,736,659 entitled "Toolholder assembly for Holding a Toolholder Shank." This patent is co-owned by the Assignee of the present application and is hereby incorporated by reference. The toolholder assembly described in that patent utilizes two locking balls which are urged radially outwardly within a tool support member to engage apertures on the shank of a toolholder. While this arrangement is efficient and permits the toolholder to be removed or secured to a tool support member in a short amount of time, the design of this arrangement may limit its application to toolholders having a width of one inch or less. Since many industrial applications require the use of a cutting tool which must be mounted on a much smaller toolholder, a need exists for a quick change toolholder system for toolholders which may be designed having a width of less than one inch.

Such a system must not only have a compact design, but furthermore, provide quick connecting and disconnecting of the toolholder from the toolholder support member in an efficient manner that makes it practical for use by a machine tool operator.

An example of a suitable compact design is described in U.S. Pat. Nos. 6,270,293 and 6,415,696, incorporated herein by reference. The design described therein includes square shank clamping components, a lock screw and a lock centering nut retained in a bore and pocket, respectively. The components fit into the tool support member with a slight clearance. When the toolholder is clamped into the tool support member it is preferred that the toolholder is radially aligned with the central radial axis of the tool support member. However, it will be appreciated that due to slight manufacturing tolerances between the various components and the cutting load experienced by the toolholder the radial location of the toolholder with respect to the centerline of the tool support member may vary.

The present invention is an improved quick change tooling system that result in improved radial location of the toolholder with respect to the tool support member.

SUMMARY OF THE INVENTION

The invention is directed to a toolholder assembly including a tool support member for releasably holding a toolholder and providing improved radial location of the toolholder with respect to the tool support member. The toolholder assembly including a tool support member, an actuating bolt, and an actuating centering nut. The tool support member includes a forwardly facing surface and a bore along a longitudinal axis and a passageway along a radial axis R1. The passageway extends through the tool support member and the bore intersects the passageway and the forwardly facing surface and extends rearwardly from the forwardly facing surface for receiving the toolholder. The passageway has a first aperture and a second aperture wherein the first aperture and the second aperture include at least two forward wall surfaces. An actuating bolt is positioned within the passageway and has a first end with a bolt locking segment having a side surface and a bolt locking surface. An actuating centering nut is rotatably fixed within the tool support member and threadably secured to a second end of the actuating bolt. The actuating centering nut has a centering nut locking segment having centering nut locking surfaces including two side surfaces. Rotation of the actuating bolt in a locking direction causes the actuating centering nut to be drawn to the bolt first end thereby forcing at least the forward wall surfaces and the actuating bolt side surface and the centering nut side surfaces to engage in at least single point contact on each side of the radial line R1 equidistance from the radial line R1 to center the actuating centering nut and the actuating bolt and the toolholder with respect to the radial axis of the bore.

BRIEF DESCRIPTION OF THE DRAWINGS

The above, as well as other features and advantages of the invention will become apparent upon consideration of the detailed description in connection with the several drawings in which.

DESCRIPTION OF THE PREFERRED EMBODIMENT

Referring to the drawings, wherein like reference characters represent like elements, there is shown a toolholder assembly 10. It should be noted that in the description of the figures, it is to be understood that such terms as "forward", "rearward" and the like, are words of convenience and are not to be construed as limiting terms apart from the invention as claimed.

The toolholder assembly 10 includes a tool support member 12 having a bore 14 adapted to releasably hold a toolholder 16. The toolholder support member 12 may be operatively secured to a machine tool (not shown) of a type well known in the art of metal cutting.

The toolholder 16 typically includes a shank 18 having attached thereto a cutting unit, for example, a cutting insert secured within a pocket. It will be appreciated that the term "toolholder" as used herein may encompass any configuration that may be used to secure a cutting tool to a tool support member 12. For a more detailed description of an example of a toolholder reference is made to U.S. Pat. Nos. 6,270,293 and 6,415,696, incorporated herein by reference.

The shank 18 of the toolholder 16 and the bore 14 of the tool support member 12 may be any number of different shapes, including cylindrical, square, rectangular, triangular and trochoidal, sufficient to accommodate an actuating bolt 20 as further described herein. The shank 18 of the toolholder 16 may have an interference fit within the bore 14 of the tool support member 12.

Figure 1:
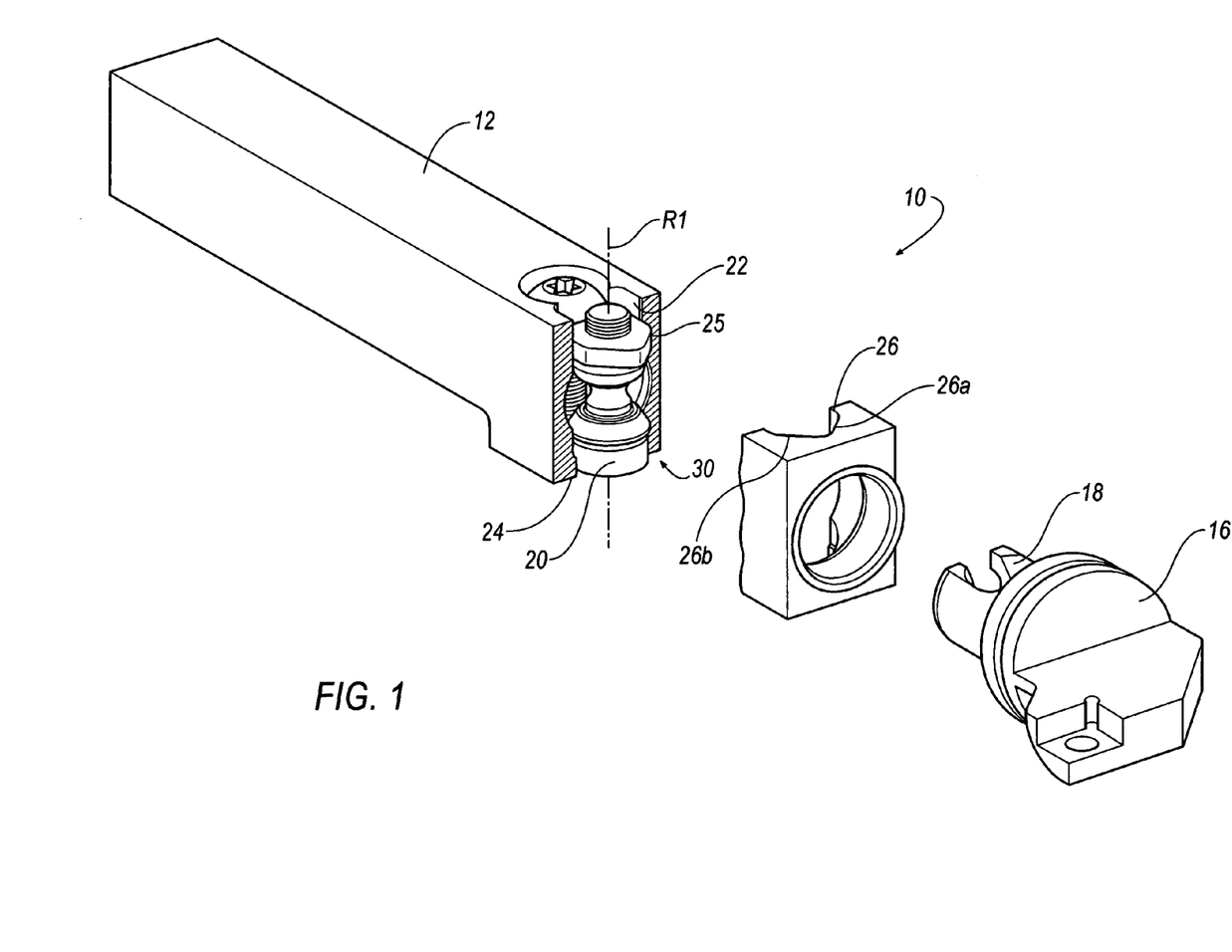
FIG. 1 is a perspective view of a toolholder assembly in accordance with the present invention.
Figure 2:
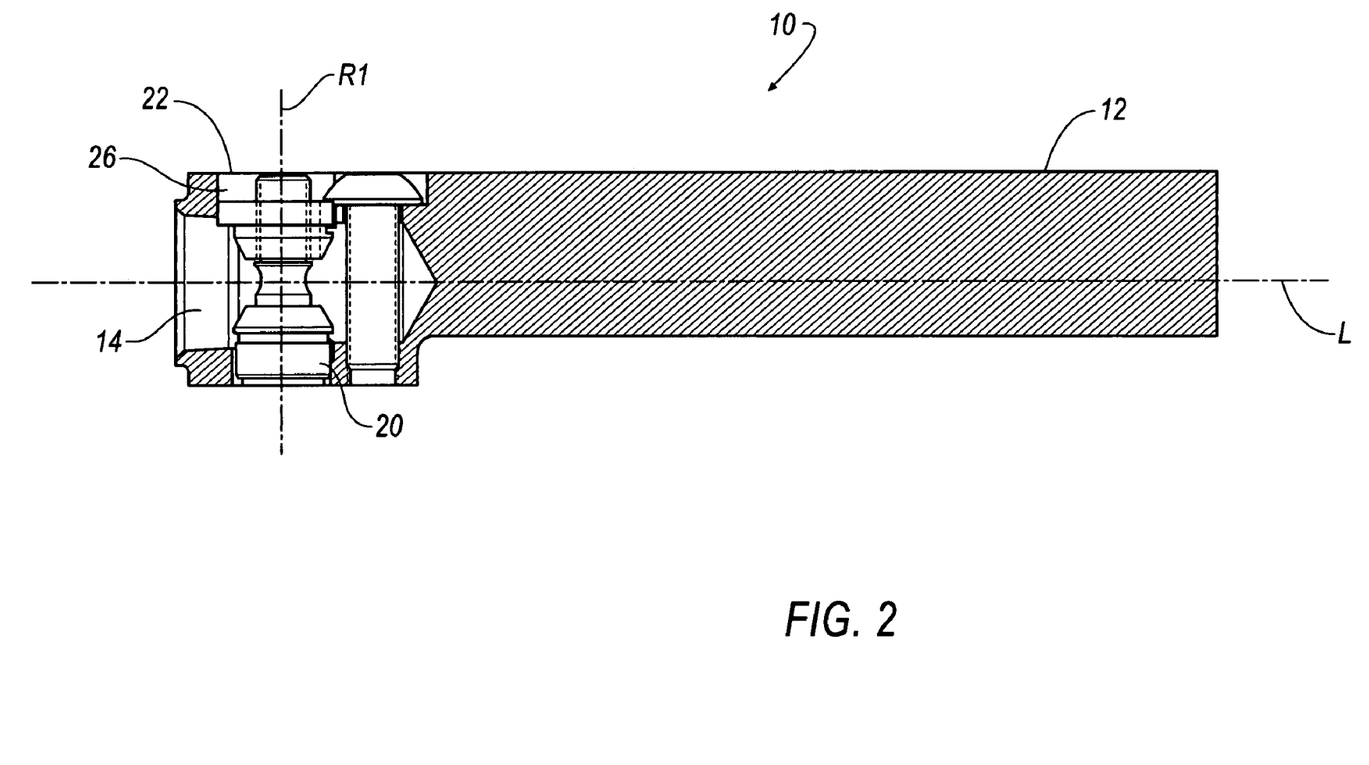
FIG. 2 is an assembled sectional view of a toolholder assembly in accordance with the present invention mounted within a slot on a machine tool.
Figure 3:
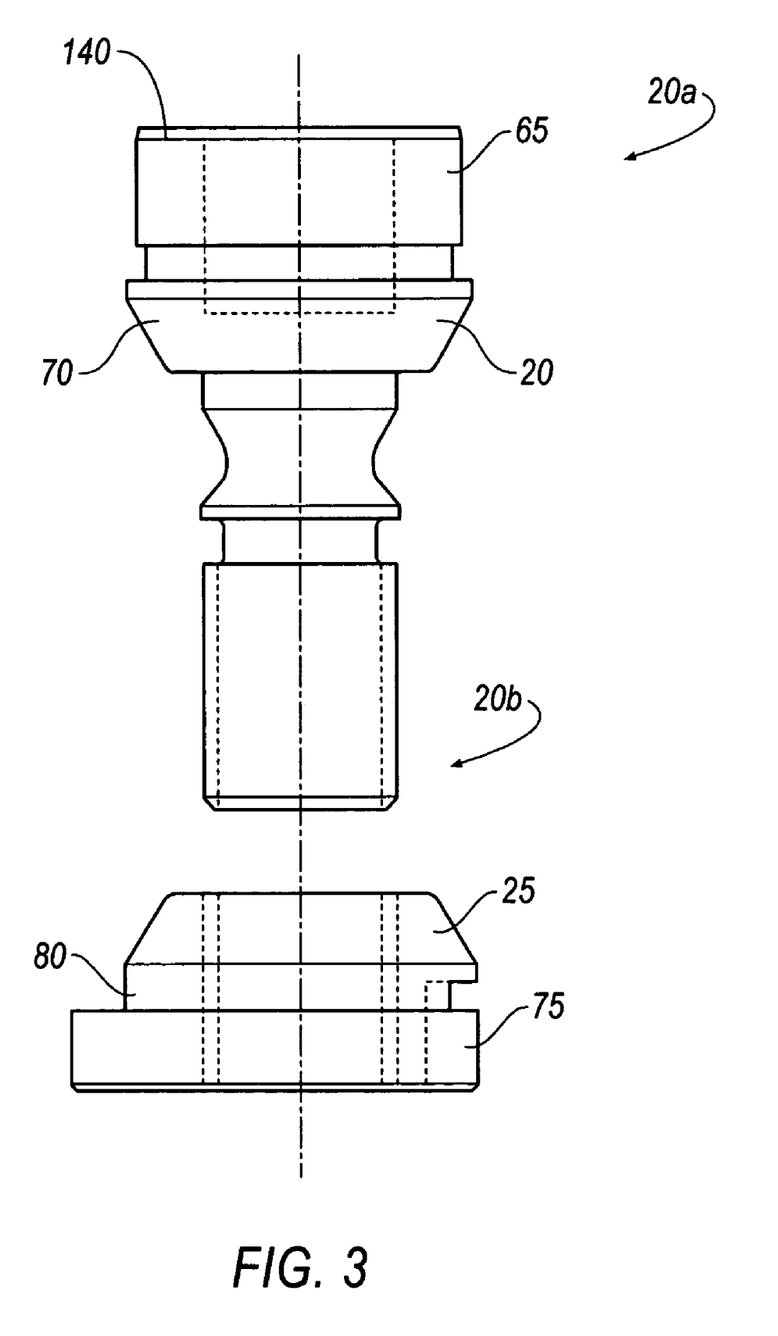
FIG. 3 is a side view of the actuating bolt and actuating centering nut.
Figure 4:
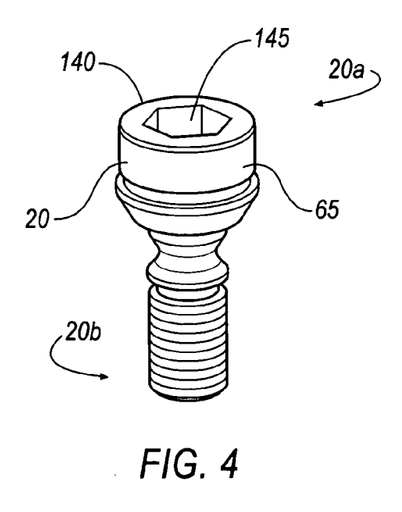
FIG. 4 is a perspective view of the actuating bolt.
Figure 5:
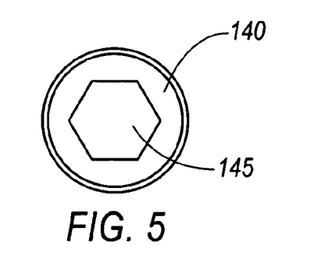
FIG. 5 is a top view of the actuating bolt.
Figure 6:
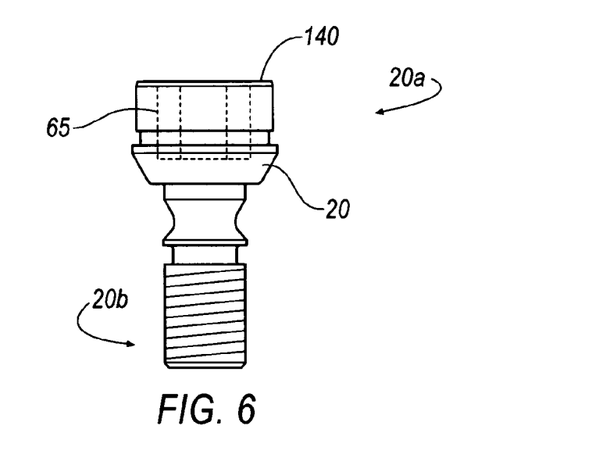
FIG. 6 is a side view of the actuating bolt.
Figure 7:
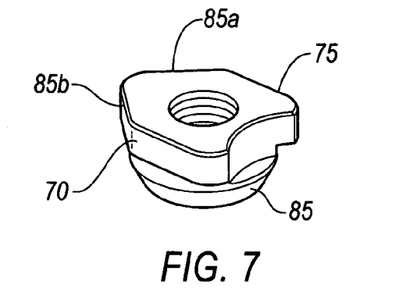
FIG. 7 is a perspective view of the actuating centering nut.
Figure 8:
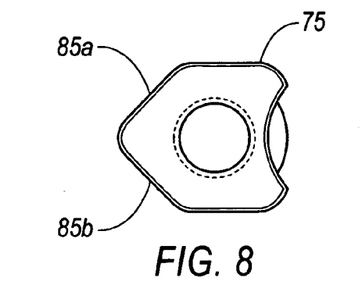
FIG. 8 is a top view of the actuating centering nut.
Figure 9:
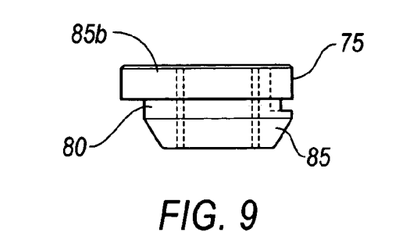
FIG. 9 is a side view of the actuating centering nut.
Figure 10:
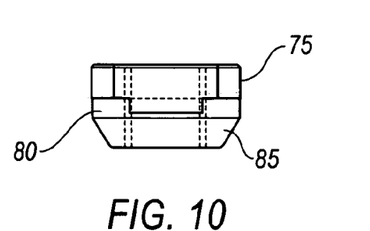
FIG. 10 is a rear view of the actuating centering nut.
Figure 11:
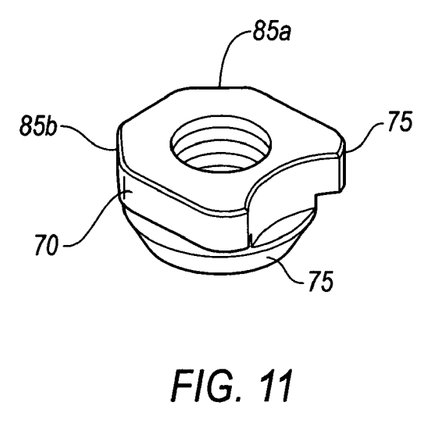
FIG. 11 is a perspective view of a actuating centering nut in accordance with another embodiment of the invention.
Figure 12:
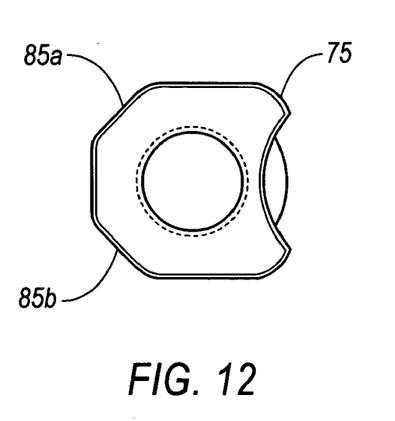
FIG. 12 is a top view of the actuating centering nut of FIG. 11.
Figure 13:
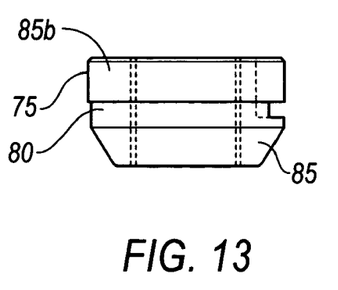
FIG. 13 is a side view of the actuating centering nut of FIG. 11.
Figure 14:
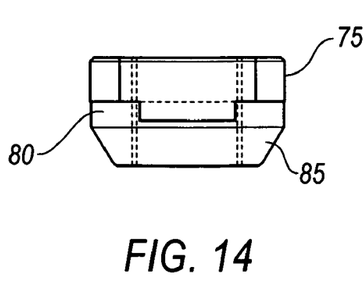
FIG. 14 is a rear view of the actuating centering nut of FIG. 11.
Figure 15:
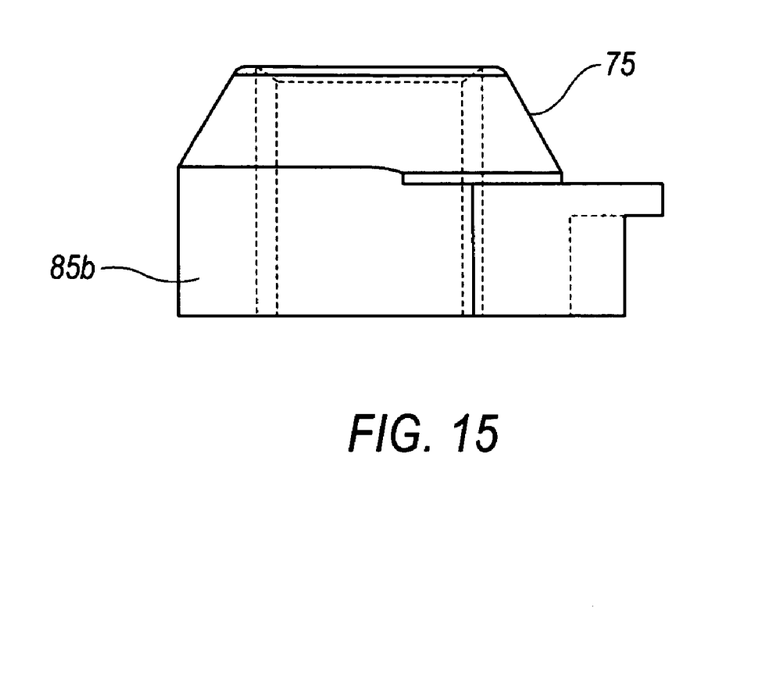
FIG. 15 is a side view of an alternate embodiment of an actuating centering nut.
Figure 16:
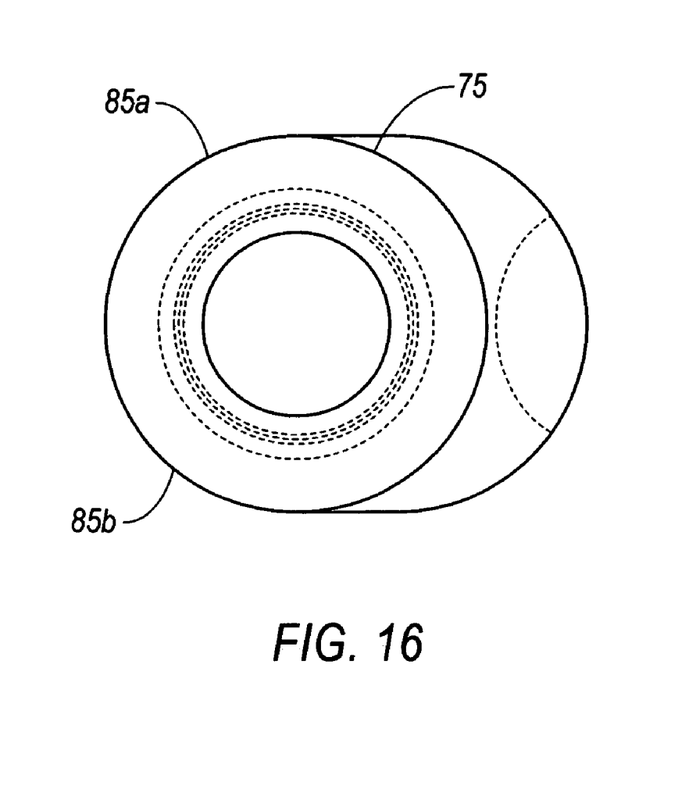
FIG. 16 is a bottom view of the actuating centering nut of FIG. 15.

As shown in FIGS. 1 and 2, the tool support member 12 includes a forwardly facing surface and a bore 14 along a longitudinal axis L. The forwardly facing surface may be mateable with an opposing rearward abutment surface on the toolholder 16 and these surfaces may be, among other shapes, conical or planar and the like, to matingly contact one another. The bore 14 extends rearwardly from the forwardly facing surface for receiving the shank 18 of the toolholder 16.

In a preferred embodiment, the actuating bolt 20 is positioned in the tool support member 12 along a radial axis R1, which is radial to the longitudinal axis L, for locking the toolholder 16 into the tool support member 12 or for ejecting the toolholder from the tool support member. As used herein the term "locking" refers to the locking of the actuating bolt with the toolholder. A more detailed description of the locking and ejecting operation of the toolholder is provided in U.S. Pat. Nos. 6,270,293 and 6,415,696. As shown in the figures, the actuating bolt 20 is positioned within a passageway 22 extending through the tool support member 12 along axis R1. The passageway 22 includes a first aperture 24 and a second aperture 26 wherein the second aperture is directly opposed to the first aperture.

Figure 17:
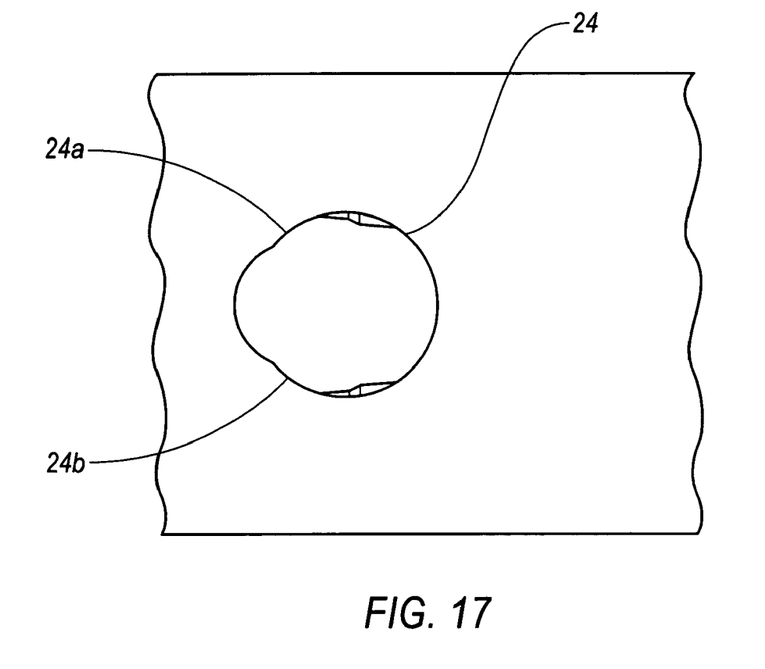
FIG. 17 is a top view of an alternate embodiment of the tool support member showing the first aperture of the passageway.
Figure 18:
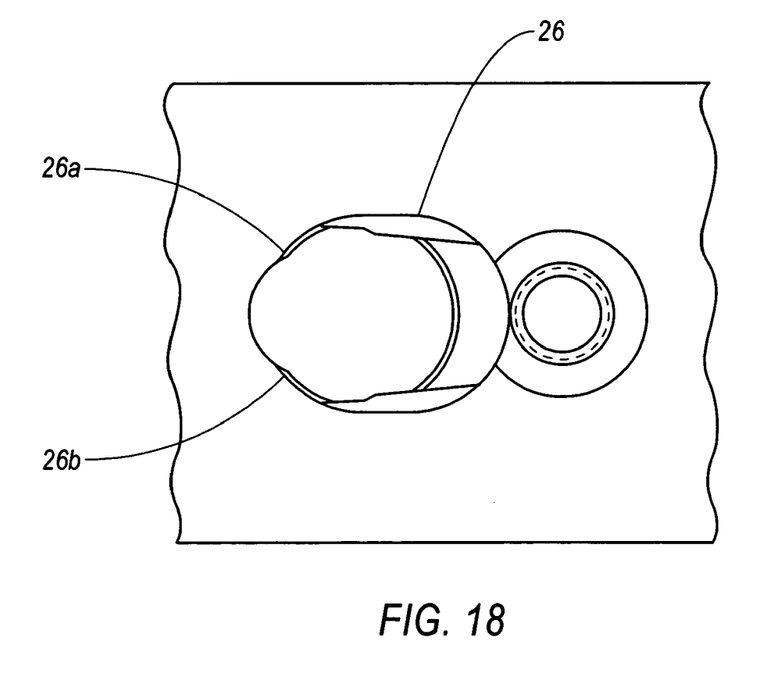
FIG. 18 is a bottom view of the tool support member showing the second aperture of the passageway of FIG. 17.

Referring to FIGS. 1 and 17, the forward portion of the first aperture 24 and the second aperture 26 of the tool support member 12 include at least two generally converging wall surfaces 24a, 24b and 26a, 26b, respectively. The surfaces 24a, 24b and 26a, 26b may be linear (FIG. 1) or curvilinear (FIG. 17 and FIG. 18), or a combination thereof as desired.

As shown in FIGS. 2–6, the actuating bolt 20 has a first end 20a and a second end 20b. At the first end 20a is a bolt locking segment 65 having a bolt locking surface 70. The bolt locking segment 65 is of a generally cylindrical shape having a side surface 65a. An actuating centering nut 75 (FIGS. 7–16) is rotatably fixed within the tool support member 12 and threadably secured to the second end 20b of the actuating bolt 20. The actuating centering nut 75 has a centering nut locking segment 80 with a centering nut locking surface 85. The shape of the actuating centering nut 75 conforms to a cavity formed by the second aperture 26. As shown in FIGS. 7–10 and 14–16, the centering nut locking surface 85 includes two generally converging side surfaces 85a and 85b. The side surfaces 85a and 85b may be linear or curvilinear or a combination thereof as desired.

In a preferred embodiment, at least the surfaces 24a, 24b and side surface 65a and surfaces 26a, 26b and side surfaces 85a and 85b are configured to engage in at least single point contact on each side of the radial line R1 equidistance from the radial line R1. It will be appreciated that when the actuating bolt 20 is rotated in a given direction, the bolt locking segment 65 and the rotationally fixed actuating centering nut 75 will move axially and linearly forward against the first aperture 24 and the second aperture 26, respectively and centralize within the bore 14. For example, rotation of the actuating bolt 20 in a locking direction, by clockwise rotation in FIG. 1, causes the actuating centering nut 75 to be drawn toward the bolt first end 22 thereby drawing together the centering nut locking surface 85 and the bolt locking surface 70 to engage lockable surfaces on the toolholder causing the bolt locking segment 65 and the side surfaces 85a and 85b of the actuating centering nut 75 to push against the forward walls 24a, 24b and 26a, 26b, respectively and center the actuating bolt 20 along the central radial axis of the bore 14. It will be appreciated that because the actuating bolt 20 is centered along the central radial axis of the bore 14 when the toolholder engages the actuating bolt 20 both the toolholder and the cutting tool are also centered with respect to the radial axis R1 and the longitudinal axis L of the tool support member 12.

The second end 20b of the actuating bolt 20 has threads which matingly engage threads on the inner wall of a bore extending through the actuating centering nut 75. The actuating bolt 20 has an actuating bolt head 140 with a cavity 145, which may be hexagonal, extending therein to accept a tool for rotating the actuating bolt 20. In the alternative, any configuration which would accept a tool for rotating the actuating bolt 20 would be acceptable and such configurations are well known to those skilled in the art of designing fasteners. Furthermore, instead of rotating the bolt, the bolt may be rotationally fixed and the actuating centering nut may be rotated using a suitable centering nut designed to permit such rotation.

FIGS. 1 and 2 show the actuating bolt 20 and the actuating centering nut 75 in a locked position to secure and center the toolholder within the tool support member 12. The first aperture 24 and the second aperture 26 of the support member 12 provide lateral support to the actuating bolt 20 and actuating centering nut 75, respectively, and allow limited movement of the actuating centering nut 75 and actuating bolt 20 along the radial axis R1. It should be noted that neither the actuating bolt 20 nor the actuating centering nut 75 are threadably secured to the first aperture 24 or the second aperture 26 of the tool support member 12. Because of this, when the shank of the toolholder is removed from the tool support member, which may occur when the toolholder assembly is in the unlocked state, then the actuating bolt 20 and the actuating centering nut 75 are free to move along the radial axis R1. By permitting this movement, when the toolholder is positioned within the tool support member 12 and the actuating bolt 20 is rotated in the locking direction, the actuating centering nut 75 is drawn toward the first end 20a of the actuating bolt 20.

It will be appreciated that although this toolholder assembly is ideal for small tools, that should not be a limitation upon its use and it should be understood that this toolholder assembly would be functional for use with a toolholder of any size or style.

It is thought the present invention and many of its intended advantages will be understood from the foregoing description and it will be apparent that various changes may be made in the form, construction and arrangement of the parts thereof without departing from the spirit or scope of the invention or sacrificing all of its material advantages, the form herein before described being merely preferred or exemplary embodiments thereof.

What is claimed is:

1. A toolholder assembly for releasably holding a toolholder, the toolholder assembly comprising:
   a tool support member having a forwardly facing surface and a bore along a longitudinal axis and a passageway along a radial axis (R1), the passageway extending through the tool support member and the bore intersecting the passageway and the forwardly facing surface and extending rearwardly from the forwardly facing surface for receiving the toolholder, the passageway having a first aperture and a second aperture wherein the first aperture and the second aperture include at least two forward wall surfaces;
   an actuating bolt positioned within the passageway and having a first end with a bolt locking segment having a side surface and a bolt locking surface; and
   an actuating centering nut rotatably fixed within the tool support member and threadably secured to a second end of the actuating bolt, the actuating centering nut having a centering nut locking segment having centering nut locking surfaces including two side surfaces;
   wherein during locking of the actuating bolt with the toolholder, the actuating centering nut is drawn to the bolt first end thereby forcing at least the forward wall surfaces and the actuating bolt side surface and the centering nut side surfaces to engage in at least single point contact on each side of the radial line (R1) equidistance from the radial line (R1) to center the actuating centering nut and the actuating bolt and the toolholder with respect to the radial axis of the bore.

2. The toolholder assembly according to claim 1 wherein the first aperture and the second aperture within the support member are directly opposed to one another.

3. The toolholder assembly according to claim 2 wherein the first aperture and the second aperture provide lateral support to the actuating bolt and the actuating centering nut respectively and allow sliding movement of the centering nut and the bolt along the radial axis, thereby permitting the centering nut and the bolt to clamp the toolholder.

4. The toolholder assembly according to claim 1 wherein the first end of the actuating bolt has a head with a cavity compatible with a tool for rotating the actuating bolt.

5. The toolholder assembly according to claim 1 wherein the actuating centering nut is axially restrained within the passageway when a toolholder shank is secured in the bore.

6. The toolholder assembly according to claim 1 wherein the actuating centering nut has a polygonal shape and fits into a matching polygonal shape in the tool support member to rotationally restrain the centering nut.

7. A toolholder assembly for releasably holding a toolholder, the toolholder assembly comprising:
   a tool support member having a forwardly facing surface and a bore along a longitudinal axis and a passageway along a radial axis (R1), the passageway extending through the tool support member and the bore intersecting the passageway and the forwardly facing surface and extending rearwardly from the forwardly facing surface for receiving the toolholder, the passageway having a first aperture and a second aperture wherein the first aperture and the second aperture include at least two generally converging forward wall surfaces;
   an actuating bolt positioned within the passageway and having a first end with a bolt locking segment having a side surface and a bolt locking surface; and
   an actuating centering nut rotatably fixed within the tool support member and threadably secured to a second end of the actuating bolt, the actuating centering nut having a centering nut locking segment having centering nut locking surfaces including two generally converging side surfaces;
   wherein during locking of the actuating bolt with the toolholder, the actuating centering nut is drawn to the bolt first end thereby forcing at least the forward wall surfaces and the actuating bolt side surface and the centering nut side surfaces to engage in at least single point contact on each side of the radial line (R1) equidistance from the radial line (R1) to center the actuating centering nut and the actuating bolt and the toolholder with respect to the radial axis of the bore.

8. The toolholder assembly according to claim 7 wherein a shape of the actuating centering nut conforms to a cavity formed by the second aperture.

9. The toolholder assembly according to claim 7 wherein the side surfaces of the actuating centering nut are linear.

10. The toolholder assembly according to claim 7 wherein the side surfaces of the actuating centering nut are curvilinear.

11. The toolholder assembly according to claim 7 wherein the side surfaces of the actuating centering nut are a combination of linear and curvilinear.

12. The toolholder assembly according to claim 7 wherein the first aperture and the second aperture within the support member are directly opposed to one another.

13. The toolholder assembly according to claim 12 wherein the first aperture and the second aperture provide lateral support to the actuating bolt and the actuating centering nut respectively and allow sliding movement of the centering nut and the bolt along the radial axis, thereby permitting the centering nut and the bolt to clamp the toolholder.

14. The toolholder assembly according to claim 7 wherein the first end of the actuating bolt has a head with a cavity compatible with a tool for rotating the actuating bolt.

15. The toolholder assembly according to claim 7 wherein the actuating centering nut is axially restrained within the passageway when a toolholder shank is secured in the bore.

16. The toolholder assembly according to claim 7 wherein the actuating centering nut has a polygonal shape and fits into a matching polygonal shape in the tool support member to rotationally restrain the centering nut.

* * * * *